(12) United States Patent
Angelow (10) Patent No.: US 10,703,249 B2
(45) Date of Patent: Jul. 7, 2020

(54) ADJUSTABLE WALL AND FLOOR SYSTEM

(71) Applicant: Justin Angelow, Faribault, MN (US)

(72) Inventor: Justin Angelow, Faribault, MN (US)

( * ) Notice: Subject to any disclaimer, the term of this patent is extended or adjusted under 35 U.S.C. 154(b) by 251 days.

(21) Appl. No.: 15/802,872

(22) Filed: Nov. 3, 2017

(65) Prior Publication Data

US 2019/0135161 A1   May 9, 2019

(51) Int. Cl.
| | | |
|---|---|---|
| *B60P 3/34* | (2006.01) | |
| *E04F 15/024* | (2006.01) | |
| *B62D 33/08* | (2006.01) | |
| *E04B 1/19* | (2006.01) | |

(52) U.S. Cl.
CPC ............... *B60P 3/34* (2013.01); *B62D 33/08* (2013.01); *E04F 15/02494* (2013.01); *E04B 2001/199* (2013.01)

(58) Field of Classification Search
CPC ............ B60P 3/34; B60P 3/341; B62D 33/08
USPC ............ 296/165, 171, 172, 175, 176, 26.09, 296/26.13
See application file for complete search history.

(56) References Cited

U.S. PATENT DOCUMENTS

| | | | | |
|---|---|---|---|---|
| 1,436,984 A | * | 11/1922 | Follett ...................... | B60P 3/34 296/175 |
| 7,802,834 B2 | * | 9/2010 | Cadena ..................... | B60P 3/34 296/165 |

* cited by examiner

*Primary Examiner* — Joseph D. Pape
(74) *Attorney, Agent, or Firm* — Renner, Otto, Boisselle & Sklar, LLP (57) ABSTRACT

An room assembly that expands the interior space in a vehicle. The room assembly comprises an expandable room comprising an adjustable floor panel component, an adjustable wall panel component, and a track system for moving the adjustable floor panel component and the adjustable wall panel component between a nested and an expanded position. The track system comprises a corner component comprising a floor engaging plate, a wall engaging plate connected to the floor engaging plate, and a rail extending from both plates.

20 Claims, 10 Drawing Sheets

ADJUSTABLE WALL AND FLOOR SYSTEM

FIELD OF THE INVENTION

This invention pertains generally to an expandable room assembly, and more particularly to a slide-out system for selectively expanding and retracting an adjustable room assembly in a vehicle.

BACKGROUND

Vehicles such as motor homes, campers, and towable trailers have a limited amount of lateral interior space as they must be able to drive on roadways. These vehicles often employ rooms that slide out from one side, useable when the vehicle is parked, to increase interior living space. The slide-out rooms are retractable when the vehicle is driven to a different location. Additionally, vehicles that are not designed for human habitation, such as box trucks, trailers, cargo containers, or fixed building structures such as mobile or fixed homes may benefit from adjustable interior space as well.

One major problem with conventional slide-out rooms is that these structures can only extend a short distance, and rely on on cantilever or bulky ridge structures for support. This limits the slide-out room to only one side of the vehicle. Another problem is that extended floors are elevated in comparison to the existing vehicle floor. Extending these types of rooms do not therefore actually increase the "floor space" of the vehicle. Even slide-out rooms that are close to the existing floor are not flush due to the floor support designs. This creates a trip hazard when the expanded floor is deployed, or when nested across the existing floor. Finally, the extending walls of conventional slide-out rooms block off interior space when the rooms are retracted.

The present invention permits the extendable interior area to adjust to greater distances than traditional designs while maintaining structural integrity and keeping the extended floor level with the fixed floor. Extendable floors and walls roll up into hidden storage areas for easy mobility and functionality. Additionally, the extendable area can be added to either side or both sides of the structure to maximize final square footage of useable interior space in a fully extended position.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a track system that can both expand and retract an expandable room assembly for a vehicle. The track system comprises a floor engaging plate connected to a wall engaging plate with a rail extending therefrom. The floor engaging plate comprises a channel cut or grooved into an inside surface of the floor engaging plate and is oriented substantially perpendicularly to the wall engaging plate. The wall engaging plate comprises a channel cut or grooved into a top surface of the wall engaging plate. The track system may further comprise an end floor engaging plate located approximately parallel to and across from the floor engaging plate. The track system may also further comprise a top wall engaging plate located approximately parallel to and above the floor engaging plate.

In one preferred embodiment, an expandable room assembly comprises an expandable room comprising an adjustable floor panel component, an adjustable wall panel component, and the track system. The expandable room assembly is extendable from a sidewall of the vehicle. The adjustable floor panel assembly comprises a plurality of floor slats adjustably connected to each other, and is retained between the floor engaging plate and the end floor engaging plate. The adjustable wall panel assembly comprises a plurality of wall slats adjustably connected to each other, and is retained between the wall engaging plate and the top wall engaging plate. The track system extends and retracts the adjustable floor panel component and the adjustable wall panel component between a nested position and expanded position.

The expandable room assembly further comprises an adjustable joist system. The adjustable joist system is attachable to a frame of the vehicle and supports the adjustable floor panel component as it is extended and retracted.

In another preferred embodiment, the expandable room assembly comprises a second expandable room extendable from a second side of the vehicle. The second expandable room comprises an adjustable floor panel component, an adjustable wall panel component, and a track system. The second expandable room assembly may be located opposite the first expandable room assembly extending from a second side of the vehicle.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to a room assembly for expanding the interior space in a vehicle that is retractable when the additional space is no longer desirable.

Referring initially to the drawings, FIGS. 1-7 illustrate an expandable room assembly 100 for use in altering the interior space in a vehicle 10, such as but not limited to, a mobile home, a recreational vehicle, a camper, a towable trailer, a box truck, a cargo container, a building structure, etc. The vehicle 10 comprises a frame 12 and a body 18. The frame comprises a plurality of fixed joists 14 that support the body 18. The body 18 comprises a floor 20, a pair of side walls 22, a pair of end walls 24 connecting the side walls 22, and a roof 26. The vehicle may further comprise a plurality of jacks (not shown) for supporting the vehicle 10 and the expandable room assembly 100.

Figure 1:
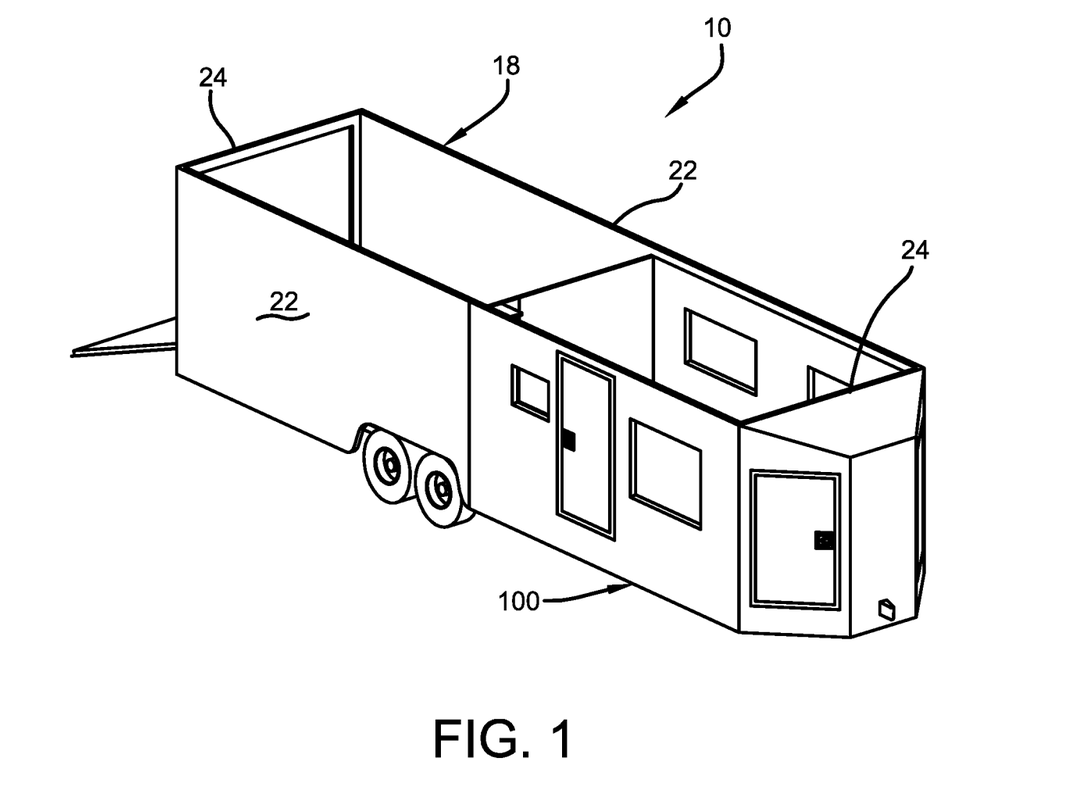
FIG. 1 illustrates a perspective view of an expandable room assembly for a vehicle in accordance with the disclosed architecture.
Figure 2:
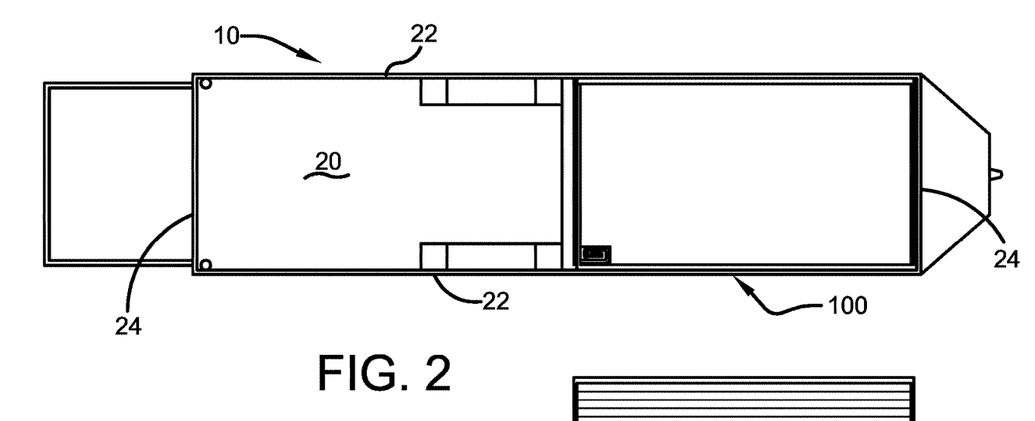
FIG. 2 illustrates an overhead view of the expandable room assembly for the vehicle in a nested position accordance with the disclosed architecture.

The expandable room assembly 100 comprises an expandable room 102. The expandable room 102 comprises an end wall 108, an outside wall 110, and a roof 112. The end wall 108, the outside wall 110, and the roof 112 are typically manufactured from rigid components comparable to those used to construct the body 18 of the vehicle 10. The end wall 108 is located adjacent to and slides along an inside of one of the pair of end walls 24 of the vehicle 10. Similarly, the roof 112 is located adjacent to and slides along an underside of the roof 26 of the vehicle 10. The outside wall 110 is located adjacent to and generally flush with one of the side walls 22 of the vehicle 10 when in a nested or un-extended position as illustrated in FIGS. 1 and 2. When in an expanded or extended position, as illustrated in FIGS. 3-7, the outside wall 110 extends laterally away from the trailer 10. The expandable room assembly 100 may be expanded and retracted by a motor, an engine, pneumatically, or by any other means known to one of skill in the art.

As illustrated in FIGS. 3 and 8-17, the expandable room 102 further comprises an adjustable floor panel component 114, an adjustable wall panel component 134, and a track system 150. The track system 150 retains both the adjustable floor panel component 114 and the adjustable wall panel component 134, and facilitates the expansion and retraction of the of the expandable room assembly 100.

Figure 14A:
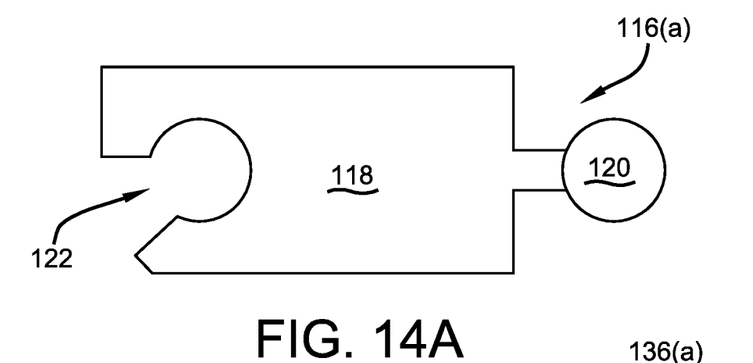
FIG. 14A illustrates a top view of a floor slat in accordance with the disclosed architecture.

The adjustable floor panel component 114 comprises a plurality of floor slats 116 that are oriented approximately in the same horizontal plane and flush with the floor 20 of the vehicle 10 when in the extended position. FIG. 14A illustrates a representative floor slat 116(a). Each floor slat 116(a) comprises a body 118, a ball, 120, a socket 122, and a hole 126. The socket 122 is located opposite the ball 120 and is cut into the body 118 at an angle to flexibly accept the ball 120 of an adjacent floor slat 116. Both the ball 120 and the socket 122 extend substantially the entire length of the body 118 along opposite sides.

The plurality of floor slats 116 are typically manufactured from extruded aluminum, metal, or plastic, and are joined together to form a flexible sliding tambour panel floor as a ball 120 of one slat engages the socket 122 from the adjacent slat 116. A plurality of joints 128 are formed along the adjustable floor panel component 114 at each ball/socket connection. The hole 126 is formed into the body 118 at an end of the body 118 that will mate with the adjustable wall panel component 134 as described infra. The hole 126 is oriented so as to face upward. The adjustable floor panel component 114 further comprises a terminal socket (not shown) and a terminal slat without a ball (not shown) for sandwiching the plurality of floor slats 116 into a unitary flexible weathertight floor.

Figure 14B:
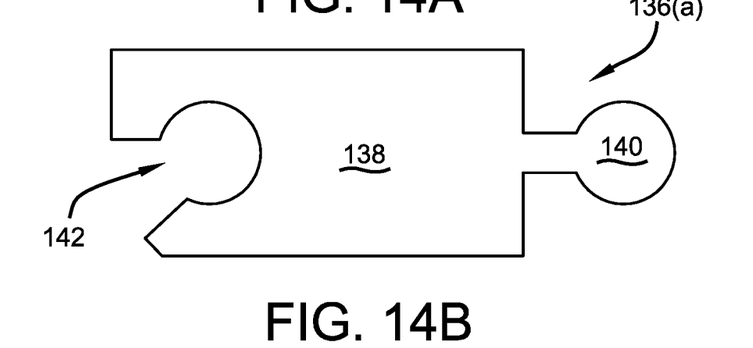
FIG. 14B illustrates a top view of a wall slat in accordance with the disclosed architecture.
Figure 15:
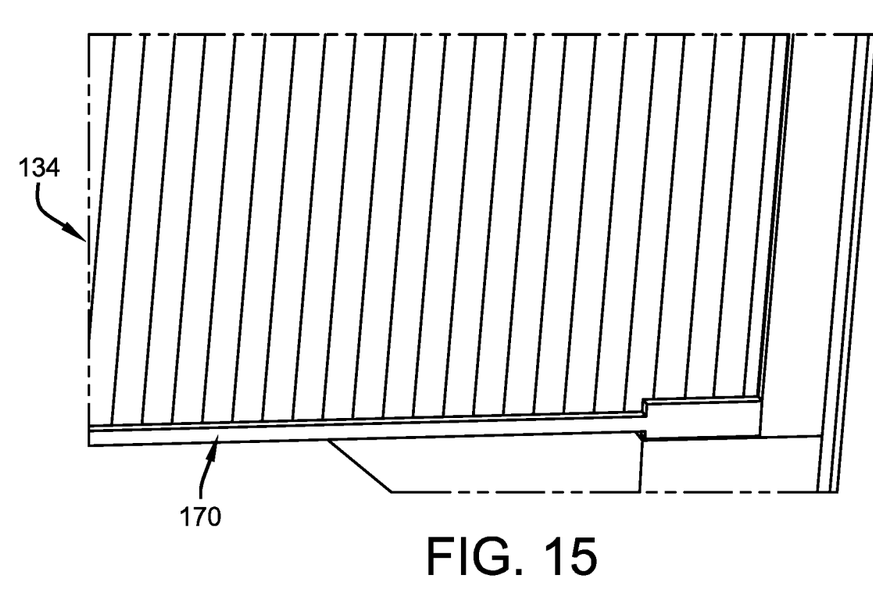
FIG. 15 illustrates a perspective view of the adjustable wall panel component in accordance with the disclosed architecture.

The adjustable wall panel component 134 comprises a plurality of wall slats 136 that are oriented approximately in the same vertical plane and parallel with the outside wall 110 of the expandable room 102 when in the extended position. FIG. 14B illustrates a representative wall slat 136(a). Each wall slat 136(a) comprises a body 138, a ball, 140, a socket 142, and a peg 144. The socket 142 is located opposite the ball 140 and is cut into the body 138 at an angle to flexibly accept the ball 140 of an adjacent floor slat 136 similar to the construction of the adjustable floor panel component 114 as described supra. Both the ball 140 and the socket 142 extend substantially the entire length of the body 138 along opposite sides.

Figure 13:
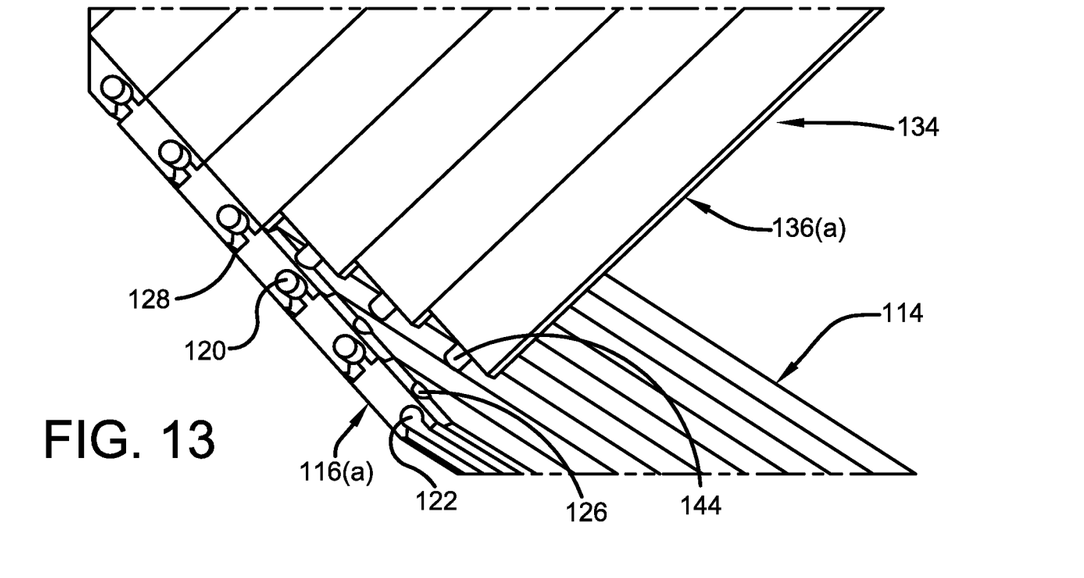
FIG. 13 illustrates a perspective cut away view of a plurality of wall slats mating with a plurality of floor slats in accordance with the disclosed architecture.

As illustrated in FIG. 13, the plurality of wall slats 136 are joined together to form a flexible sliding tambour panel wall as a ball 140 of one slat 136 engages the socket 142 from an adjacent slat 136. The peg 144 extends distally out of one of the ends of the body 138 and mates with one of the floor slats 116 of the adjustable floor panel component 114. As the expandable room 102 extends outward, each peg 144 engages the corresponding hole 126 to form a joint between the adjustable floor panel component 114 and the adjustable wall panel component 134. The adjustable wall panel component 134 further comprises a terminal socket (not shown) and a terminal slat without a ball (not shown) for sandwiching the plurality of wall slats 136 into a unitary flexible weathertight wall.

As illustrated in FIGS. 8-12, the track system 150 comprises a corner component 152. The corner component 152 is initially located under the floor 20 of the vehicle 10 when the expandable room 102 is in the nested position. The corner component 152 comprises a floor engaging plate 154, a wall engaging plate 162, and a rail 170. The floor engaging plate 154 comprises an inside surface 156 with a channel 158 molded into, cut, or extruded therein. The channel 158 is typically coiled or spiral in configuration. The channel 158 is configured to accept the end of the adjustable floor panel component 114 comprising the holes 126. In the nested position, the adjustable floor panel component 114 rolls up and is coiled and substantially completely retained by the floor engaging plate 154. In the extended position, the adjustable floor panel component 114 extends out of the channel 158 to form a substantially flat floor surface that mates with and extends the floor 20 of the vehicle 10 without a gap. The floor engaging plate 154 further comprises a top edge 160 that mates with the wall engaging plate 162.

The wall engaging plate 162 comprises a top surface 164 with a channel 166 molded into, cut, or extruded therein. The channel 166 is similar in configuration to the channel 158 of the floor engaging plate 154. The channel 166 is configured to accept an end of the adjustable wall component 134 comprising the pegs 144. In the nested position, the adjustable wall panel component 134 rolls up and is coiled and substantially completely retained by the wall engaging plate 162. In the extended position, the adjustable wall panel component 134 extends out of the channel 166 to form a substantially flat wall surface that runs parallel with the outside wall 110 of the expandable room 102. The wall engaging plate 162 further comprises an outside edge 168 that mates with the top edge 160 of the floor engaging plate 154. The floor engaging plate 154 extends downward from the floor 20 of the vehicle 10; with the wall engaging plate 162 joined substantially perpendicularly to the floor engaging plate 154 extending from the top edge 160.

The rail 170 extends perpendicularly from both the floor engaging plate 154 and the wall engaging plate 162. If the floor engaging plate 154 is oriented along an x-axis and the wall engaging plate 162 is oriented along a y-axis, the rail 170 will extend along a z-axis. The rail 170 essentially forms a joist like support for retaining, joining, and supporting both the adjustable floor panel component 114 and the adjustable wall panel component 134 when extended.

Figure 16:
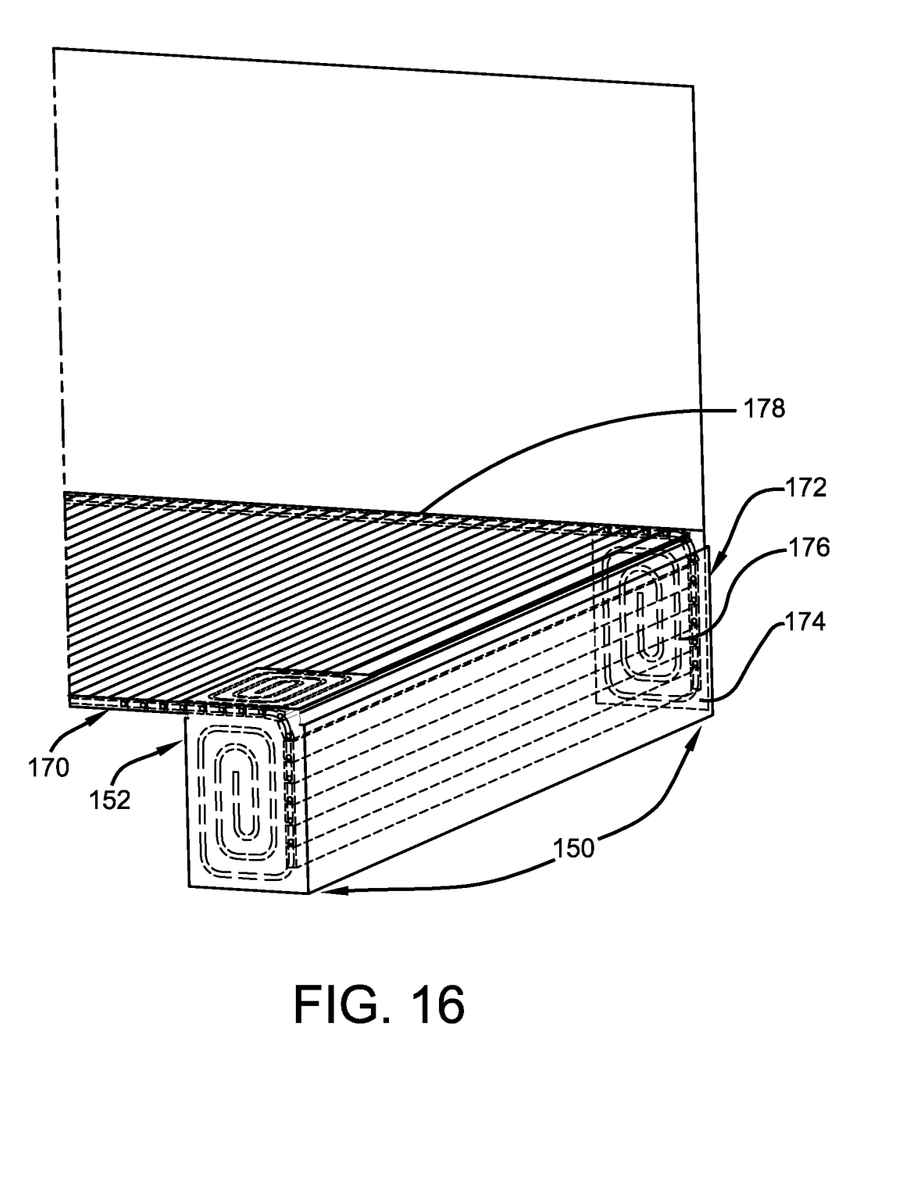
FIG. 16 illustrates a perspective cut away view of an end floor engaging plate and end rail of the track system in accordance with the disclosed architecture.
Figure 17:
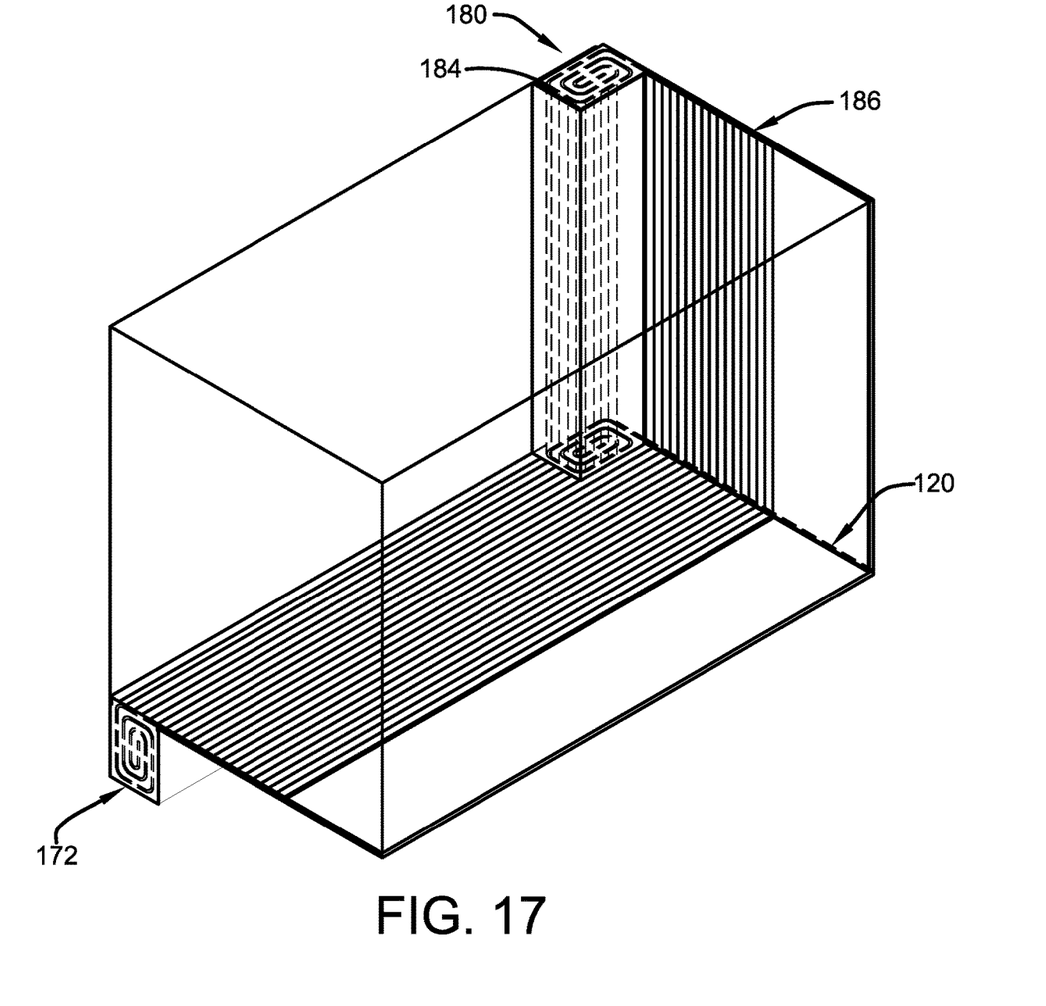
FIG. 17 illustrates a perspective cut away view of a top wall engaging plate and top rail of the track system in accordance with the disclosed architecture.

As illustrated in FIGS. 16 and 17, the track system 150 further comprises an end floor engaging plate 172 and an end rail 178 extending from the end floor engaging plate 172. The end floor engaging plate 172 is oriented substantially parallel to the floor engaging plate 154, and comprises an inside surface 174 comprising a channel 176 similar in configuration to and facing the floor engaging plate 154. The end floor engaging plate 172 is oppositely disposed from and faces the floor engaging plate 154. The end floor engaging plate 172 is configured to accept the other end of the adjustable floor panel component 114. In the nested position, the adjustable floor panel component 114 is completely retained within the floor engaging plate 154 and the end floor engaging plate 172. When in the extended position, the end rail 178 essentially forms a joist-like support for retaining, joining, and supporting both the adjustable floor panel component 114 and the end wall 108 of the expandable room 102.

The track system 150 further comprises a top wall engaging plate 180 and a top rail 186 extending from the top wall engaging plate 180. The top wall engaging plate 180 is oriented substantially parallel to the wall engaging plate 162, and comprises a bottom surface 182 comprising a channel 184 similar in configuration to and facing the wall engaging plate 162. The top wall engaging plate 180 is oppositely disposed from and faces the wall engaging plate 162. The top wall engaging plate 180 is configured to accept the other end of the adjustable wall panel component 134. In the nested position, the adjustable wall panel component 134 is completely retained within the wall engaging plate 162 and the top wall engaging plate 180. When in the extended position, the top rail 186 essentially forms a joist-like support for retaining, joining, and supporting both the adjustable wall panel component 134 and the roof 112 of the expandable room 102. Both the top rail 186 and the end rail 178 may be coated with a lubricant to facilitate extension and retraction of the adjustable wall panel component 134 and the adjustable floor panel component 114.

Figure 4:
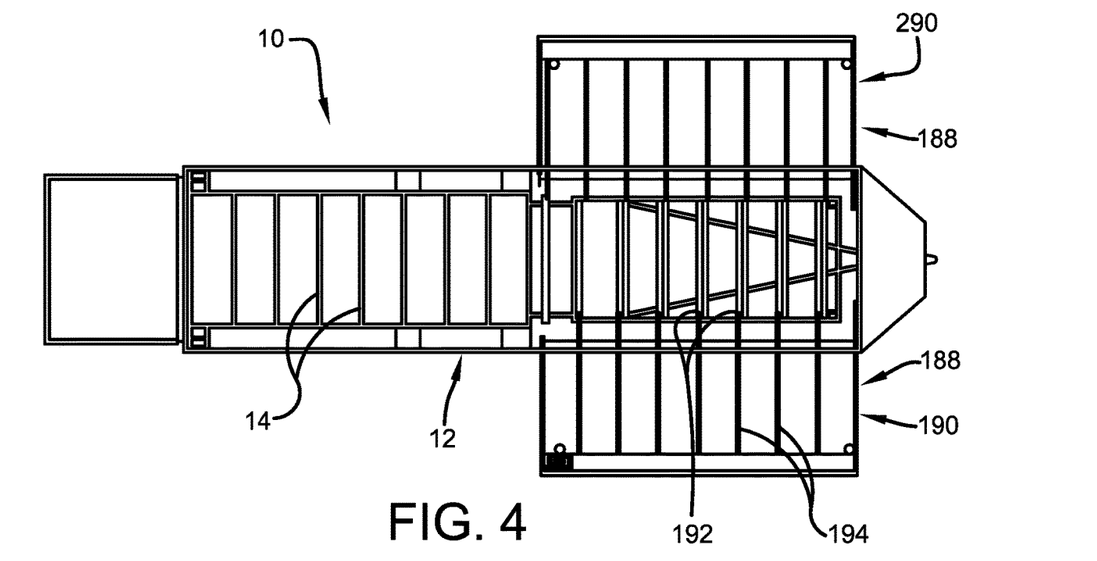
FIG. 4 illustrates an underneath view of an adjustable joist system of the expandable room assembly engaging a frame of the vehicle in accordance with the disclosed architecture.
Figure 5:
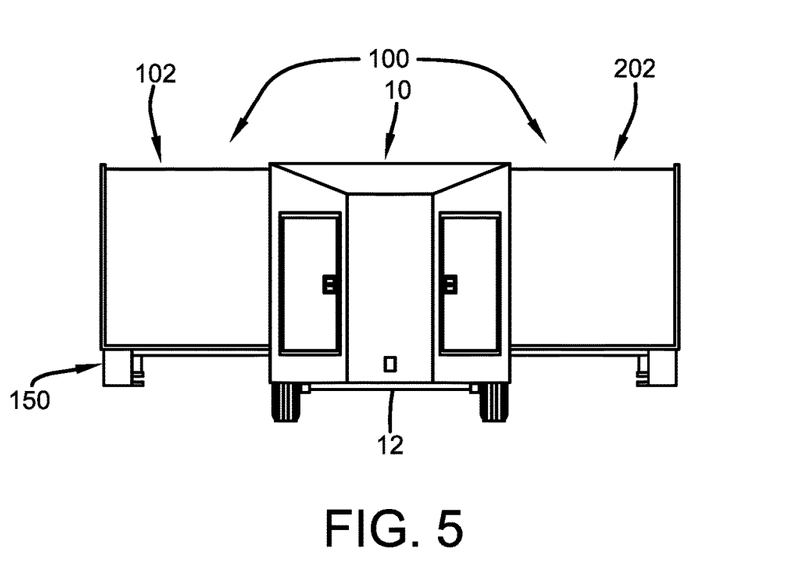
FIG. 5 illustrates an end view of the first expandable room and the second expandable room of the expandable room assembly in accordance with the disclosed architecture.
Figure 6:
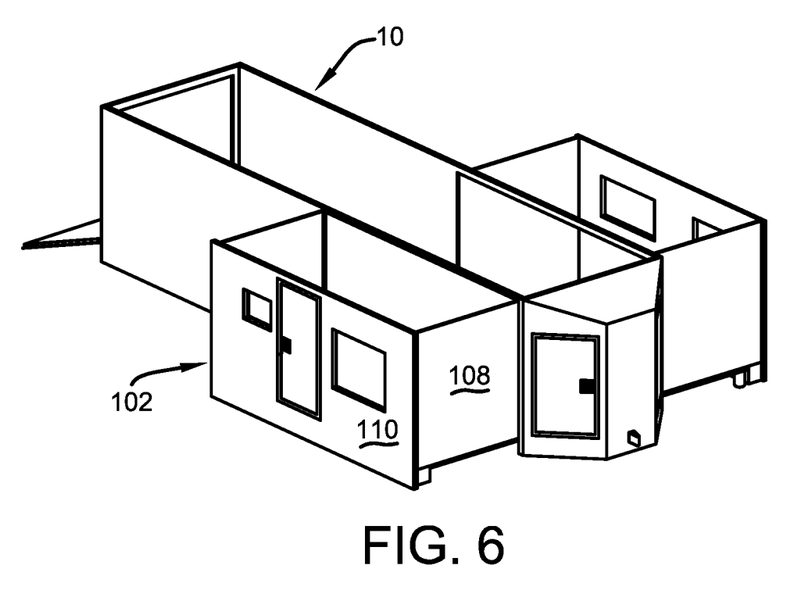
FIG. 6 illustrates a perspective view of the expandable room assembly and the vehicle without a roof removed in accordance with the disclosed architecture.
Figure 7:
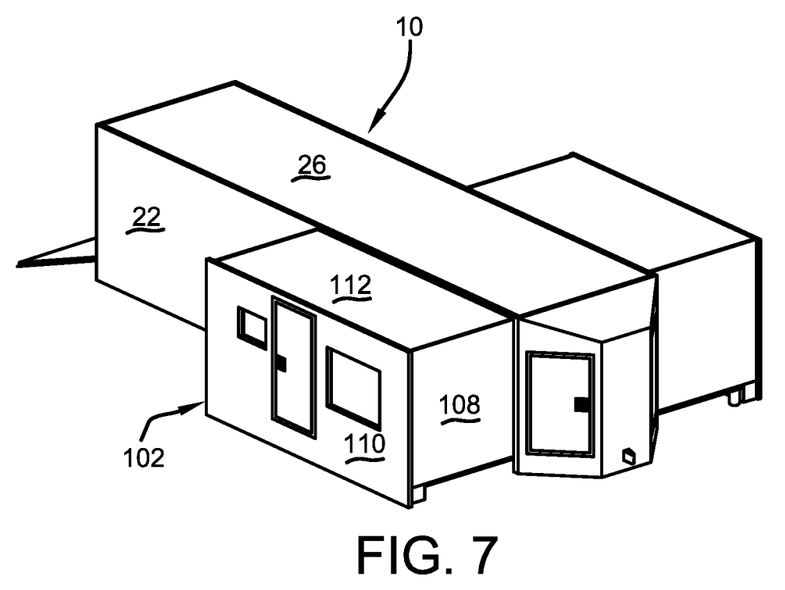
FIG. 7 illustrates a perspective view of the expandable room assembly in accordance with the disclosed architecture.
Figure 8:
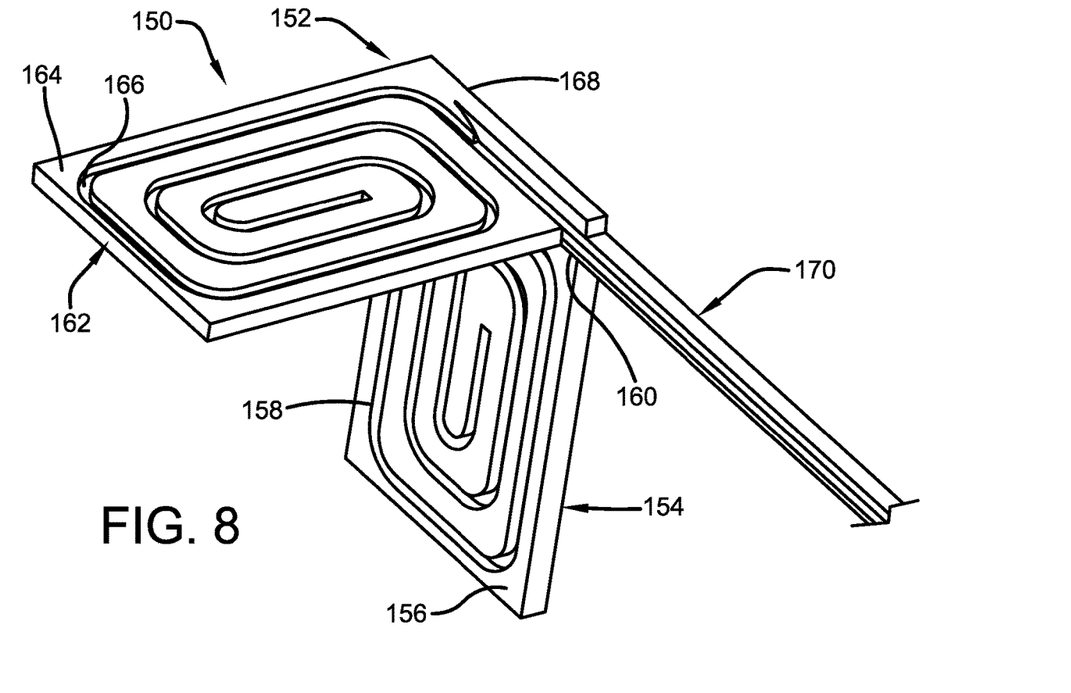
FIG. 8 illustrates a perspective view of a track system of the expandable room assembly in accordance with the disclosed architecture.
Figure 9:
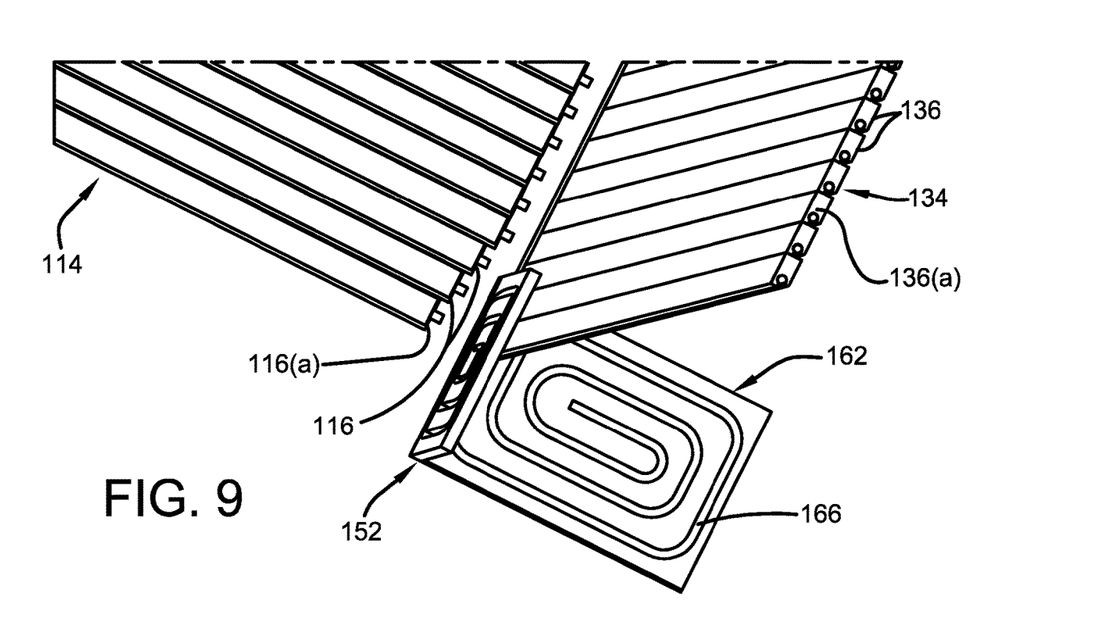
FIG. 9 illustrates an exploded cut away view of an adjustable floor panel component and an adjustable wall panel component of the expandable room assembly engaging a corner component of the track system in accordance with the disclosed architecture.
Figure 10:
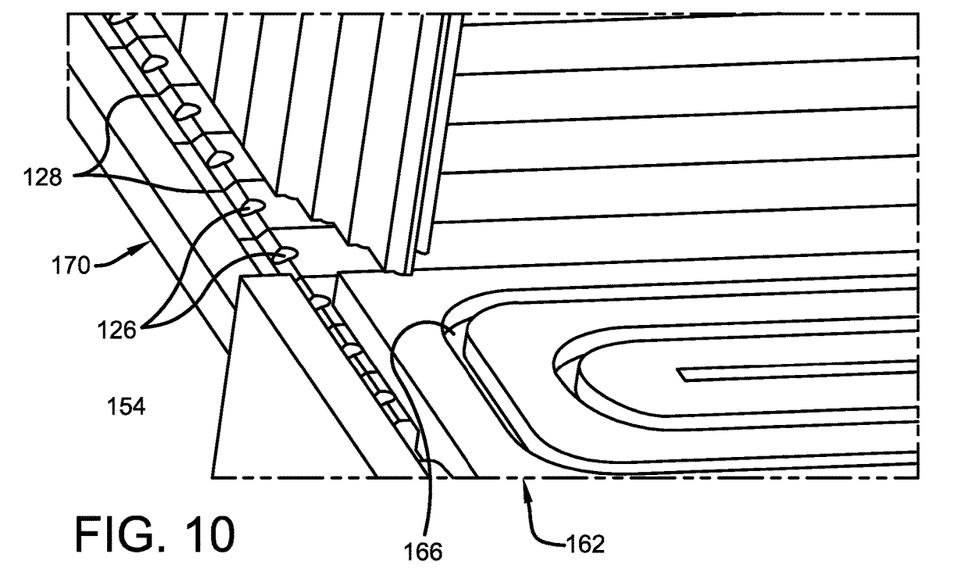
FIG. 10 illustrates an exploded cut away view of the adjustable floor panel component and the adjustable wall panel component in accordance with the disclosed architecture.
Figure 11:
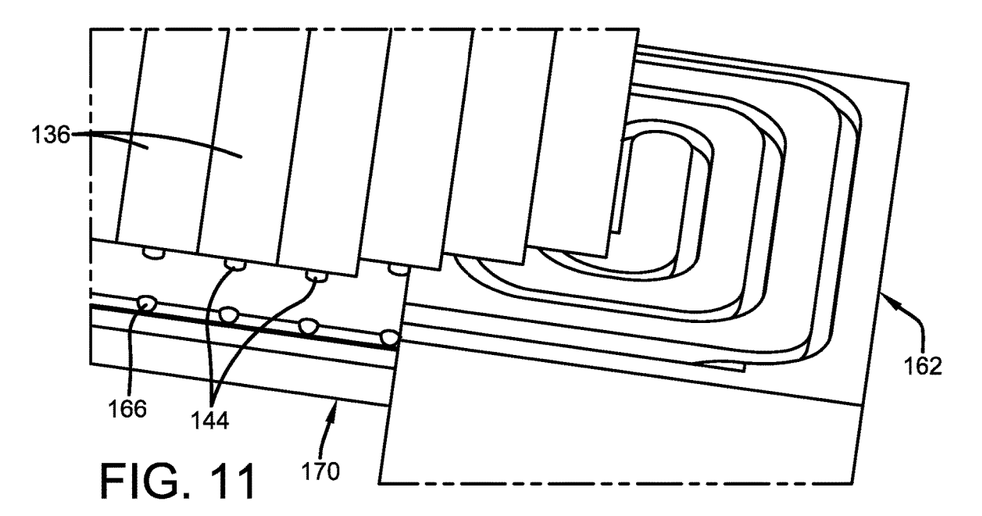
FIG. 11 illustrates an exploded cut away view of the adjustable floor panel component and the adjustable wall panel component in accordance with the disclosed architecture.
Figure 12:
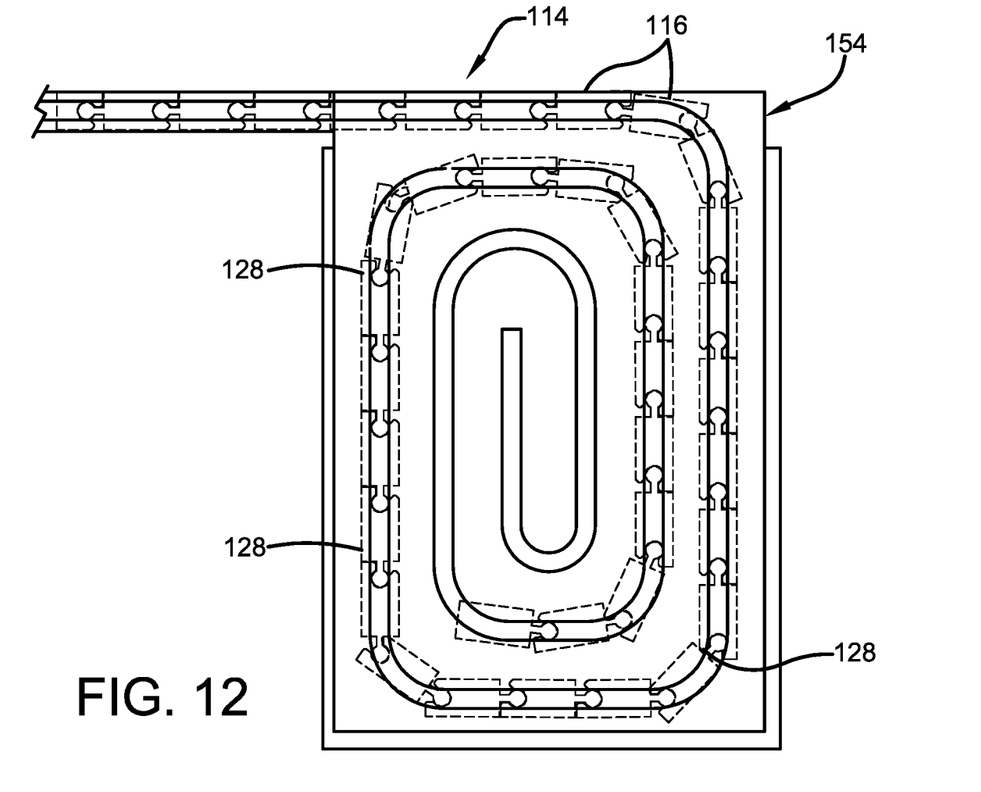
FIG. 12 illustrates a side view of the adjustable floor panel component partially nested in the corner component of the track system in accordance with the disclosed architecture.

The expandable room 102 further comprises an adjustable joist system 188 as illustrated in FIG. 4. The adjustable joist system 188 is attached to the vehicle 10 and adjustably supports the adjustable floor panel component 114 when extended. The adjustable wall panel component 134 comprises a set of adjustable joists 190 each joist comprising a frame engaging portion 192 and an extension portion 194. The frame engaging portion 192 is attached or welded to one of the plurality of fixed joists of the frame 12 of the vehicle 10. The extension portion 194 extends or telescopes outward to support the adjustable floor panel component 114 as it extends. The adjustable joist system 188 may further comprise an enclosure (not shown) to protect the joists 14 and the set of adjustable joists 190 from contaminants.

Figure 3:
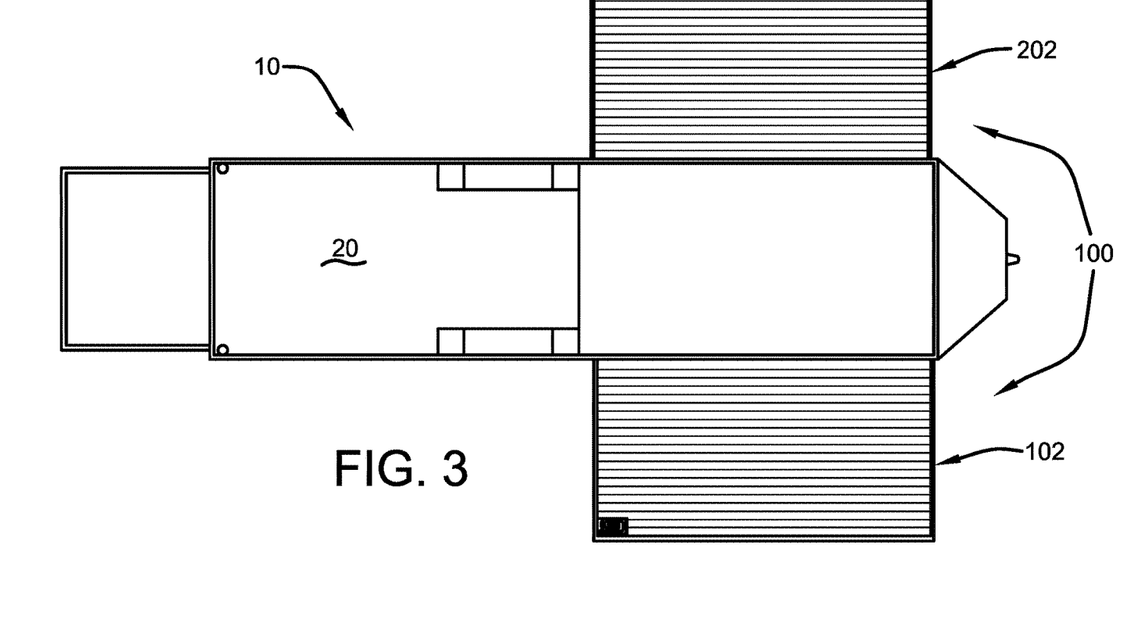
FIG. 3 illustrates an overhead view of a first expandable room and a second expandable room of the expandable room assembly each in an expanded position in accordance with the disclosed architecture.

In another embodiment, the expandable room assembly 100 further comprises a second expandable room 202 as illustrated in FIG. 3. The second expandable room 202 comprises an adjustable floor panel component, an adjustable wall panel component, a track system, and a second set of adjustable joists 290. The second expandable room 202 is configured similarly to the expandable room 102, and may expand from the opposite one of the pair of side walls 22 of the vehicle 10.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A track system for expanding and retracting an expandable room assembly, the track system comprising:
   a corner component comprising:
      a floor engaging plate;
      a wall engaging plate joined to the floor engaging plate; and
      a rail extending from the floor engaging plate and the wall engaging plate.

2. The track system of claim 1, wherein the floor engaging plate comprises a channel.

3. The track system of claim 2, wherein the channel is coiled in configuration.

4. The track system of claim 1, wherein the wall engaging plate comprises a channel.

5. The track system of claim 4, wherein the channel is formed into a top surface of the wall engaging plate.

6. The track system of claim 1, wherein the floor engaging plate is oriented substantially perpendicular to the wall engaging plate.

7. The track system of claim 1, further comprising an end floor engaging plate oriented substantially parallel to the floor engaging plate.

8. The track system of claim 7, wherein the end floor engaging plate comprises a channel oriented to face the floor engaging plate.

9. The track system of claim 1, further comprising a top wall engaging plate oriented substantially parallel to the wall engaging plate.

10. The track system of claim 9, wherein the top wall engaging plate comprises a channel oriented facing the wall engaging plate.

11. An expandable room assembly comprising:
    an adjustable floor panel component;
    an adjustable wall panel component; and
    a track system for retaining the adjustable floor panel component and the adjustable wall panel component,
    wherein the adjustable wall panel component comprises a plurality of wall slats,
    wherein each one of the plurality of wall slats comprise a body, a ball, and a socket.

12. An expandable room assembly comprising:
    an adjustable floor panel component;
    an adjustable wall panel component; and
    a track system for retaining the adjustable floor panel component and the adjustable wall panel component,
    wherein the adjustable wall panel component is configured as a sliding flexible wall.

13. The expandable room assembly of claim 11, wherein the track system comprises a corner component comprising a floor engaging plate and a wall engaging plate extending substantially perpendicularly from the floor engaging plate.

14. An expandable room assembly comprising:
    an adjustable floor panel component;
    an adjustable wall panel component;
    a track system for retaining the adjustable floor panel component and the adjustable wall panel component; and
    an adjustable joist system attached to the vehicle for supporting the adjustable floor panel component.

15. The expandable room assembly of claim 14, wherein the adjustable floor panel component comprises a plurality of floor slats.

16. The expandable room assembly of claim 15, wherein each one of the plurality of floor slats comprise a body, a ball, and a socket.

17. The expandable room assembly of claim 16, wherein the ball of one of the plurality of floor slats engages the socket of an adjacent floor slat.

18. The expandable room assembly of claim 14, wherein the adjustable floor panel component is configured as a sliding flexible floor.

19. The expandable room assembly of claim 12, wherein the track system comprises a corner component comprising a floor engaging plate and a wall engaging plate extending substantially perpendicularly from the floor engaging plate.

20. The expandable room assembly of claim 14, wherein the track system comprises a corner component comprising a floor engaging plate and a wall engaging plate extending substantially perpendicularly from the floor engaging plate.

* * * * *